Patented Dec. 22, 1936

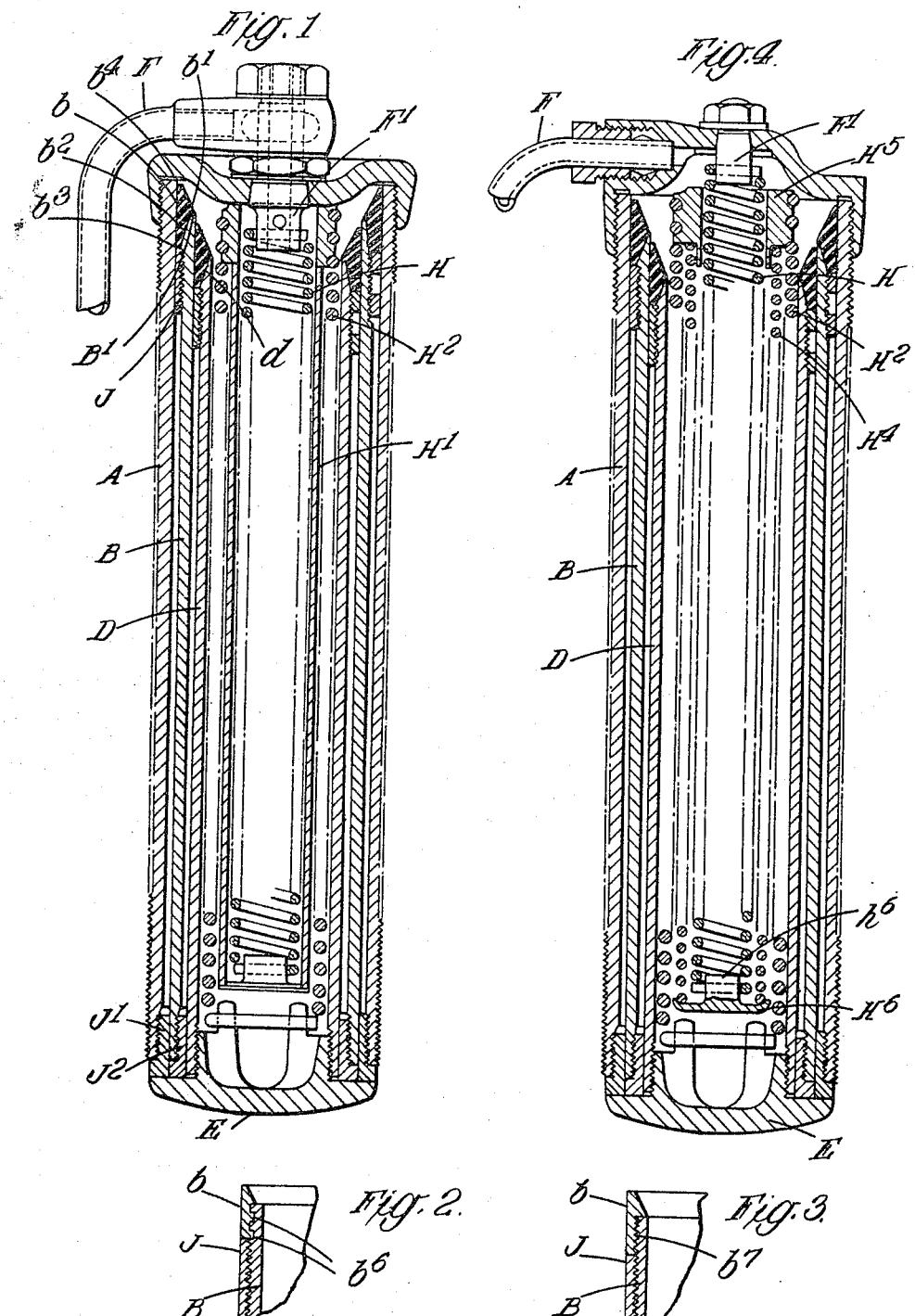

2,065,030

UNITED STATES PATENT OFFICE 2,065,030

FLUID PRESSURE OPERATED LIFTING JACK

Donald Wilfred Sessions, Willesden, London, England

Application December 6, 1935, Serial No. 53,156
In Great Britain July 2, 1935

5 Claims. (Cl. 121—46)

This invention relates to fluid pressure operated lifting jacks and more particularly, although not essentially, to such jacks of the kind comprising one or more tubular plungers normally retained in a cylinder and pushed out of the cylinder telescopically by fluid pressure when desired.

In order that the invention may be clearly understood and readily carried into effect the same will now be described with reference to the accompanying drawing in which:—

Figure 1 is a central sectional view of a lifting jack made in accordance with the invention;

Figures 2 and 3 are detail views illustrating two modifications; and

Figure 4 is a view similar to Figure 1 but illustrating a modification.

The jack comprises an outer cylinder A which may be permanently attached to a motor-vehicle and a piston or plunger B therein having a packing ring $b$ which fits within the cylinder A, and an inner piston or plunger D having a packing ring $d$ which fits within the hollow piston or plunger B. The piston or plunger B also acts as a cylinder for the piston D inside it. The piston D has a ground engaging foot E at its lower end. The fluid under pressure can be supplied to the interior of the cylinder and piston through a pipe F and a nozzle $F^1$. For returning the pistons into the cylinder a spring H is connected at its upper end to the nozzle $F^1$ and at its lower end to the bottom of a tube $H^1$ and a spring $H^2$ is connected to the upper end of the tube $H^1$ and to the foot E. The pistons B and D are completely open at their upper ends. The packing rings $b$, $d$, are annular rubber packing rings capable of retaining the high pressure required and are attached to the metal plungers B, D, by being directly vulcanized thereto. The attachment is not effected merely by a rubber solution or other adhesive, or by moulding the rubber into position, but is attached by being directly vulcanized to the plungers. Thus screw-threaded rings or other clamping means for clamping the packing rings are not required, which is a great advantage particularly when the jack is required to occupy a small space, for instance, if it is to be permanently attached to a motor-vehicle. The upper ends of the tubular plungers B, D, are reduced or chamfered on their outer surfaces to form frusto-conical ends having the small diameters at the extreme ends of the plungers. Referring to the plunger B, this chamfering leaves a flat annular end surface $b^1$ of about half the area of the flat annular end surface before being chamfered. From the chamfered part downward the plunger is screw-threaded on its outer surface to receive an abutment ring J which is screwed down as far as the screw-threading permits. The rubber packing ring has an outer plain cylindrical surface to fit the cylinder A and a frusto-conical inner surface $b^2$ which fits and is vulcanized directly to the said chamfered surface on the piston and an adjacent end flat annular surface $b^3$ which is attached by direct vulcanization to the ring J. The packing ring extends beyond the end of the plunger to form a free half or end $b^4$ which is also of frusto-conical internal shape and where the two internal frusto-conical formations meet there is an annular lip $b^1$ which extends inwardly to lap over the end flat annular surface $B^1$ of the plunger and may be vulcanized directly thereto. The outer end of the packing ring will have a suitable degree of flexibility by reason of its decreased thickness towards its extreme outer end. The abutment ring J will contact with a ring $J^1$ or other stop on the inside of the cylinder to limit the extent of movement of the plunger.

The packing ring $d$ is constructed and arranged similarly to the packing ring $b$ and the plunger D is chamfered and provided with a ring similar to the ring J for engaging a ring $J^2$ on the plunger B.

In the modification shown in Figure 2 the packing ring is moulded into grooves $b^6$ in the piston B, and in the further modification shown in Figure 3 the packing ring is moulded into screw-threads $b^7$ on the piston B and comprises a continuation of the threads for the ring J. These packing rings also are vulcanized to the metal pistons.

In the arrangement shown in Figure 4 the tube $H^1$ of Figure 1 is replaced by a third spring $H^4$ which is a compression spring and two annuli $H^5$, $H^6$. The annulus $H^6$ is in the form of a disc having a central boss $h^6$ to which the lower end of the inner spring H is attached. The other part of the disc acts against the lower end of the spring $H^4$. The upper annulus $H^5$ is externally screw-threaded for attachment thereto of the upper end of the outer spring $H^2$ and this annulus bears against the top of the compression spring $H^4$. Thus when the jack is extended the inner and outer springs are lengthened and are in tension whilst the intermediate spring $H^4$ is shortened and is in compression, with the result that for a given extension of the jack the inner and outer springs will be extended to a less extent than they would be if a rigid tube were substituted for the intermediate spring H⁴. The spring H⁴ may be fairly stiff and may be wound in the opposite direction to the other springs, e. g. if the inner and outer springs correspond to a right-handed screw-thread the intermediate spring may correspond to a left-handed screw-thread.

What I claim and desire to secure by Letters Patent of the United States is:—

1. A fluid pressure operated lifting jack comprising a cylinder, at least one hollow plunger within the cylinder, a tension spring connected to the cylinder at one end, a second tension spring connected at one end to the plunger, a compression spring, and means whereby the two tension springs act upon the compression spring to compress it when the plunger is forced to move out of the cylinder.

2. A fluid pressure operated lifting jack as in claim 1, wherein the springs are concentrically arranged with the compression spring between the inner and outer tension springs and said means comprise two annuli one of which is attached to the outer spring and bears on one end of the compression spring and the other of which is attached to the inner spring and bears on the other end of the compression spring.

3. A fluid pressure operated lifting jack as in claim 1, wherein the springs are concentrically arranged with the compression spring between the inner and outer tension springs and the compression spring is wound in the opposite direction to the tension springs.

4. A fluid pressure operated lifting jack comprising a cylinder, at least two hollow plungers mounted concentrically within the cylinder, fluid pressure washers on the plungers attached thereto by direct vulcanization, a compression spring and two tension springs arranged concentrically within the inner plunger one of the tension springs being attached to the cylinder and the other being attached to the inner plunger, and means whereby the two tension springs act on opposite ends of the compression spring to compress it when the jack is extended.

5. A fluid pressure operated lifting jack comprising a cylinder, at least two hollow plungers mounted concentrically within the cylinder, a compression spring and two tension springs arranged concentrically within the inner plunger one of the tension springs being attached to the cylinder and the other being attached to the inner plunger, and means whereby the two tension springs act on opposite ends of the compression spring to compress it when the jack is extended.

DONALD WILFRED SESSIONS.